(12) United States Patent
Tian et al.

(10) Patent No.: US 11,994,395 B2
(45) Date of Patent: May 28, 2024

(54) METHOD, MACHINE READABLE MEDIUM, DEVICE, AND VEHICLE FOR DETERMINING A ROUTE CONNECTING A PLURALITY OF DESTINATIONS IN A ROAD NETWORK, METHOD, MACHINE READABLE MEDIUM, AND DEVICE FOR TRAINING A MACHINE LEARNING MODULE

(71) Applicant: Bayerische Motoren Werke Aktiengesellschaft, Munich (DE)

(72) Inventors: Jilei Tian, Chicago, IL (US); Yang Cao, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 816 days.

(21) Appl. No.: 16/937,610

(22) Filed: Jul. 24, 2020

(65) Prior Publication Data
US 2022/0026222 A1 Jan. 27, 2022

(51) Int. Cl.
*G01C 21/34* (2006.01)
*G01C 21/36* (2006.01)
*G06N 20/00* (2019.01)

(52) U.S. Cl.
CPC ..... *G01C 21/3407* (2013.01); *G01C 21/3453* (2013.01); *G01C 21/3626* (2013.01); *G06N 20/00* (2019.01)

(58) Field of Classification Search
CPC ............ G01C 21/3407; G01C 21/3453; G01C 21/3626; G01C 21/343; G06N 20/00; G06N 3/006; G06N 3/045; G06N 3/088
See application file for complete search history.

(56) References Cited

U.S. PATENT DOCUMENTS

| 2002/0103599 A1* | 8/2002 | Sugiyama | G01C 21/3453 |
| | | | 701/426 |
| 2002/0120398 A1* | 8/2002 | Matsuda | G01C 21/3632 |
| | | | 340/995.23 |

(Continued)

OTHER PUBLICATIONS

Irwan Bello et al.: Neural Combinatorial Optimization with Reinforcement Learning; under review as a conference paper at ICLR 2017; arXiv:1611.09940v3 [cs.AI] Jan. 12, 2017.

(Continued)

*Primary Examiner* — Bhavesh V Amin
(74) *Attorney, Agent, or Firm* — Yong Beom Hwang; 2SPL Patent Attorneys PartG mbB

(57) ABSTRACT

Embodiments provide a method, a machine readable medium, a device and a vehicle for determining a route connecting a plurality of destinations in a road network, and a method, a machine readable medium and a device for training a machine learning module for determining a route connecting a plurality of destinations in a road network. The method for determining a route connecting a plurality of destinations in a road network comprises receiving input information, which comprises information on distances between the plurality of destinations in the road network. The method further comprises inputting the input information on the distances into a trained machine learning module and providing output information on the route connecting the plurality of destinations based on an output of the trained machine learning module.

10 Claims, 5 Drawing Sheets

(56) References Cited

U.S. PATENT DOCUMENTS

| | | | | |
|---|---|---|---|---|
| 2002/0120622 A1* | 8/2002 | Hasegawa | G01C 21/20 | |
| 2002/0138196 A1* | 9/2002 | Polidi | G01C 21/3682 | 340/995.1 |
| 2002/0156572 A1* | 10/2002 | Bullock | G01C 21/3484 | 340/988 |
| 2002/0177948 A1* | 11/2002 | Upparapalli | G08G 1/096861 | 340/539.1 |
| 2003/0036848 A1* | 2/2003 | Sheha | H04W 4/02 | 340/990 |
| 2003/0060978 A1* | 3/2003 | Kokojima | G01C 21/20 | 701/434 |
| 2003/0069690 A1* | 4/2003 | Correia | G01C 21/3476 | 701/431 |
| 2003/0093219 A1* | 5/2003 | Schultz | G05D 1/0005 | 701/533 |
| 2003/0109266 A1* | 6/2003 | Rafiah | G01C 21/3423 | 455/456.1 |
| 2003/0122688 A1* | 7/2003 | Niitsuma | G08G 1/096872 | 701/431 |
| 2004/0034467 A1* | 2/2004 | Sampedro | G08G 1/20 | 701/533 |
| 2004/0158397 A1* | 8/2004 | Cho | G06Q 10/047 | 701/533 |
| 2004/0254723 A1* | 12/2004 | Tu | G01C 21/3679 | 701/410 |
| 2004/0260465 A1* | 12/2004 | Tu | G01C 21/34 | 701/426 |
| 2005/0027442 A1* | 2/2005 | Kelley | G01C 21/362 | 701/425 |
| 2005/0096840 A1* | 5/2005 | Simske | G08G 1/096888 | 340/995.19 |
| 2005/0102102 A1* | 5/2005 | Linn | G01C 21/3682 | 701/411 |
| 2005/0154720 A1* | 7/2005 | Kurosawa | G01C 21/3611 | |
| 2005/0187707 A1* | 8/2005 | Yokota | G01C 21/3476 | 701/410 |
| 2005/0216181 A1* | 9/2005 | Estkowski | G08G 1/166 | 340/995.23 |
| 2005/0251299 A1* | 11/2005 | Donnelly | B60L 15/20 | 701/19 |
| 2006/0015249 A1* | 1/2006 | Gieseke | G08G 1/096872 | 340/995.19 |
| 2006/0229807 A1* | 10/2006 | Sheha | G01C 21/3679 | 701/468 |
| 2006/0241853 A1* | 10/2006 | Gadler | G01S 13/91 | 707/999.107 |
| 2006/0241855 A1* | 10/2006 | Joe | G01C 21/34 | 340/995.19 |
| 2006/0241856 A1* | 10/2006 | Cobleigh | G01C 21/26 | 340/995.19 |
| 2006/0241857 A1* | 10/2006 | Onishi | G01C 21/3476 | 340/995.19 |
| 2006/0253247 A1* | 11/2006 | de Silva | G01C 21/3679 | 701/426 |
| 2007/0005242 A1* | 1/2007 | Kato | G08G 1/096827 | 701/467 |
| 2007/0032942 A1* | 2/2007 | Thota | G09B 29/008 | 701/426 |
| 2007/0078596 A1* | 4/2007 | Grace | G01C 21/3644 | 701/533 |
| 2007/0106468 A1* | 5/2007 | Eichenbaum | G06Q 30/02 | 701/431 |
| 2007/0179708 A1* | 8/2007 | Sekine | G01C 21/3446 | 701/532 |
| 2007/0198178 A1* | 8/2007 | Trimby | G06N 5/01 | 701/533 |
| 2007/0208492 A1* | 9/2007 | Downs | G08G 1/0104 | 701/117 |
| 2007/0208497 A1* | 9/2007 | Downs | G08G 1/0104 | 701/117 |
| 2007/0208498 A1* | 9/2007 | Barker | G08G 1/0969 | 701/117 |
| 2007/0219706 A1* | 9/2007 | Sheynblat | G01C 21/3679 | 701/532 |
| 2007/0276709 A1* | 11/2007 | Trimby | A63F 13/00 | 705/6 |
| 2007/0288155 A1* | 12/2007 | Kaneda | G08G 1/096838 | 701/465 |
| 2008/0076451 A1* | 3/2008 | Sheha | G01C 21/3679 | 455/456.3 |
| 2008/0082255 A1* | 4/2008 | Takahata | G01C 21/3815 | 701/533 |
| 2008/0114542 A1* | 5/2008 | Nambata | G01C 21/3453 | 701/533 |
| 2008/0120021 A1* | 5/2008 | Kaneda | G08G 1/123 | 701/533 |
| 2008/0120022 A1* | 5/2008 | Hayot | G01C 21/3476 | 701/533 |
| 2008/0125968 A1* | 5/2008 | Bradicich | G01C 21/3617 | 340/995.19 |
| 2008/0133120 A1* | 6/2008 | Romanick | G01C 21/3469 | 701/123 |
| 2008/0140309 A1* | 6/2008 | Jendbro | G01C 21/3614 | 701/533 |
| 2008/0147473 A1* | 6/2008 | Zhong | G01C 21/3484 | 701/25 |
| 2008/0154489 A1* | 6/2008 | Kaneda | G09B 29/10 | 701/533 |
| 2008/0262717 A1* | 10/2008 | Ettinger | G01C 21/34 | 701/467 |
| 2008/0275646 A1* | 11/2008 | Perng | G01C 21/3476 | 701/414 |
| 2008/0319645 A1* | 12/2008 | Kumagai | G08G 1/01 | 701/533 |
| 2009/0037101 A1* | 2/2009 | Koike | G01C 21/3682 | 701/533 |
| 2009/0099985 A1* | 4/2009 | Tesauro | G06N 5/02 | 706/12 |
| 2009/0105944 A1* | 4/2009 | Urano | G01C 21/3673 | 701/533 |
| 2009/0132161 A1* | 5/2009 | Akita | G01C 21/3647 | 701/532 |
| 2009/0222198 A1* | 9/2009 | Raynaud | G01C 21/3461 | 701/532 |
| 2009/0248288 A1* | 10/2009 | Bell | G01C 21/36 | 701/532 |
| 2011/0302116 A1* | 12/2011 | Ide | G08G 1/096844 | 706/12 |
| 2012/0011137 A1* | 1/2012 | Sheha | H04L 67/52 | 707/E17.014 |
| 2012/0185229 A1* | 7/2012 | Perrett | H04L 45/64 | 703/13 |
| 2015/0066649 A1* | 3/2015 | Kumar | G01C 21/3476 | 705/14.64 |
| 2015/0285652 A1* | 10/2015 | Peri | G01C 21/3476 | 701/438 |
| 2015/0292894 A1* | 10/2015 | Goddard | G01C 21/3453 | 701/400 |
| 2015/0339575 A1* | 11/2015 | Streit | G06N 5/04 | 706/48 |
| 2016/0202074 A1* | 7/2016 | Woodard | G06Q 10/047 | 701/465 |
| 2016/0363455 A1* | 12/2016 | Masutani | G08G 1/096827 | |
| 2017/0357918 A1* | 12/2017 | Kim | G01C 21/343 | |
| 2018/0003516 A1* | 1/2018 | Khasis | G08G 1/207 | |
| 2018/0238698 A1* | 8/2018 | Pedersen | G01C 21/343 | |
| 2018/0268371 A1* | 9/2018 | Van Hentenryck | G06Q 10/06315 | |
| 2019/0061147 A1* | 2/2019 | Luciw | G06N 3/082 | |

OTHER PUBLICATIONS

Mohammareza Nazari et al.: Reinforcement Learing for Solving the Vehicle Routing Problem; Department of Industrial and Systems Engineering Lehigh University, Bethlehem, PA 18015.

W. Kool et al.: Attention, learn to solve routing problems !; In ICLR 2019: International Conference on Learing Representations: New

(56) References Cited

OTHER PUBLICATIONS

Orleans, Louisiana, United States, May 6-May 9, 2019 Open Review.

* cited by examiner

METHOD, MACHINE READABLE MEDIUM, DEVICE, AND VEHICLE FOR DETERMINING A ROUTE CONNECTING A PLURALITY OF DESTINATIONS IN A ROAD NETWORK, METHOD, MACHINE READABLE MEDIUM, AND DEVICE FOR TRAINING A MACHINE LEARNING MODULE

FIELD

Embodiments relate to a method, a machine readable medium, a device and a vehicle for determining a route connecting a plurality of destinations in a road network, a method, a machine readable medium and a device for training a machine learning module for determining a route connecting a plurality of destinations in a road network, more particularly, but not exclusively, to a concept for training and using a machine learning module of a vehicle to determine an optimized route along multiple destinations, complying to predetermined time constraints for the multiple destinations, and having a low response latency.

BACKGROUND

In modern navigation systems it may be desired to have low complexity constraint optimization solutions to improve route planning, charging, delivery, fleet management, etc. In theory, a travelling salesman problem (TSP) can be formulated based on a given list of cities and the distances between each pair of cities. Finding the shortest possible route that visits each city and returns to the origin city can be challenging. The TSP is an NP-hard problem that has no fast or scalable optimal solution. In practice, there are many use cases requiring a scalable optimization service to improve a user experience.

In the-state-of-the-art technology, deep and/or reinforcement learning has been applied in TSP or alike that has potential to provide fast but sub-optimal solutions.

Further information can be found in:
"Neural Combinatorial Optimization with Reinforcement Learning", published by Google in ICLR, 2017, https://arxiv.org/pdf/1611.09940.pdf, which uses pointer networks to address the TSP problem. This algorithm takes coordinates as input to train a model.
"Reinforcement leaning for solving the vehicle routing problem", published by Lehigh University in NIPS, 2018, https://papers.nips.cc/paper/8190-reinforcement-learning-for-solving-the-vehicle-routing-problem.pdf, improves pointer networks.
"Attention, learn to solve routing problems!", published by University of Amsterdam in ICLR, 2019, leverages a transformer to build an algorithm.

SUMMARY

Real life traffic scenarios can be challenging as visiting places in a given time period may be required. The places may have asymmetric routing distances due to one-way limitation, and there may be a high number of places to visit. It is a finding that for a given pair of locations represented by coordinates, the distance between them varies depending on the road network and the distance is very likely to be longer than a straight line between the locations. Thus, embodiments use a scalable algorithm based on route distances, rather coordinates, to address real life use cases. Embodiment may address a constraint route optimization or improvement having a low response latency suitable for an application programming interface (API) service. Embodiments may use a low complexity algorithm solution that may improve the complexity with acceptable sub-optimal performance using reinforcement learning to address real life scenarios. Embodiments may provide enabling technology toward an optimization as a service (OaaS). To achieve this goal, embodiments may support real life scenarios, e.g. routing distance rather Euclidean distance or coordinators between two locations, visit the places constraint by a given time period rather than having no arrival time limitation, dealing with asymmetric routing distances due to one way route limitation rather than always having same distances between two places for either direction, and a variety number of visit places to avoid use case limitation. All in all, embodiments may provide a fast algorithm being able to generate acceptable API (application programming interface) response time upon request.

Embodiments may provide a machine learning algorithm framework for an NP-hard problem with scalable real-time performance. For example, transformer-based encoder/decoder may be used with embedding and reward functions showing an efficient algorithm for solving various TSPs with time-window constraints (TW).

Embodiments provide a method for determining a route connecting a plurality of destinations in a road network. The method comprises receiving input information, which comprises information on distances between the plurality of destinations in the road network. The method further comprises inputting the input information on the distances into a trained machine learning module and providing output information on the route connecting the plurality of destinations based on an output of the trained machine learning module. Using distances from a road network is more compliant with real life scenarios than using Euclidean distances.

The input information may further comprise information on a time window constraint for at least one of the plurality of destinations, and the method may comprise inputting the information on the time window constraint into the trained machine learning module. Embodiments may further consider time window constraints for the destinations as in a real-life scenario).

The information on the distances between the destinations may comprise a matrix with mutual distances between pairs of the plurality of destinations. Using a matrix enables to formulate symmetric and asymmetric distances in the same structure. For example, the mutual distances between the pairs may be at least partly asymmetric, e.g. one or more pairs have asymmetric distances, which also addresses realistic scenarios.

In some embodiments the method may further comprise determining embedding information for the machine learning module. Using an embedding function adapted to the respective input parameters or information may enable using a universal machine learning module. The embedding information may comprise a vector with a predetermined size. Using a predetermined size may enable to adapt to various input dimensions. For example, the method comprises adapting the input information to a predetermined number of destinations. The adapting may comprise complementing the plurality of destinations to the predetermined number of destinations by introducing virtual destinations. The utilization of virtual destinations may enable using the same implementation for multiple input dimensions. For example, the adapting may comprise complementing destinations without a time window constraint with a non-restrictive time window constraint. Embodiments may unify the input parameter dimensions to enable use of a common machine learning module.

Embodiments also provide a machine-readable medium including code, when executed, to cause a machine to perform the above method for determining a route connecting a plurality of destinations in a road network. Another embodiment is a device comprising processing circuitry configured to perform one of the methods described herein. Yet another embodiment is a vehicle comprising an embodiment of such a device.

Embodiments also provide a method for training a machine learning module for determining a route connecting a plurality of destinations in a road network. The method comprises generating coordinates for the plurality of destinations and calculating distances between the plurality of destinations based on the coordinates. The method further comprises introducing at least one asymmetry to the distances to obtain asymmetric distances and training the machine learning module based on the asymmetric distances. Embodiments may also provide an effective training concept for a machine learning module.

For example, the generating may comprise generating at least two random coordinates per destination and combining at least two distances based on the at least two coordinates per destination for calculating the distances. Embodiments may enable efficient generation of realistic training distances. The method may comprise generating time window constraint information for the plurality of destinations, e.g. to make the training data more realistic. The generating of the time window constraint information can be based on the asymmetric distances. In some embodiments the generating of the time window constraint information may assume a random sequence of the asymmetric distances and assign at least partly rational time window constraints to destinations fitting the given random sequence. That way, a close to real-life training data set with at least one proper solution can be generated.

In further embodiments the training of the machine learning module comprises determining rewards for candidate routes determined by the machine learning module. That way, the training success can be enhanced by using rewards to also provide quality information for a specific solution. The determining of the rewards may be based on an overall distance of a candidate route, e.g. the shorter the distance the better the solution. The determining of the rewards may be further based on a compliance of a sequence of the plurality of destinations in a candidate route with predetermined time window constraints for the plurality of destinations. In embodiments the better a solution matches the time window constraints the higher the reward.

Embodiments also provide a machine-readable medium including code, when executed, to cause a machine to perform the method for training a machine learning module for determining a route connecting a plurality of destinations in a road network. Another embodiment is a device comprising processing circuitry configured to perform one the methods described herein.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
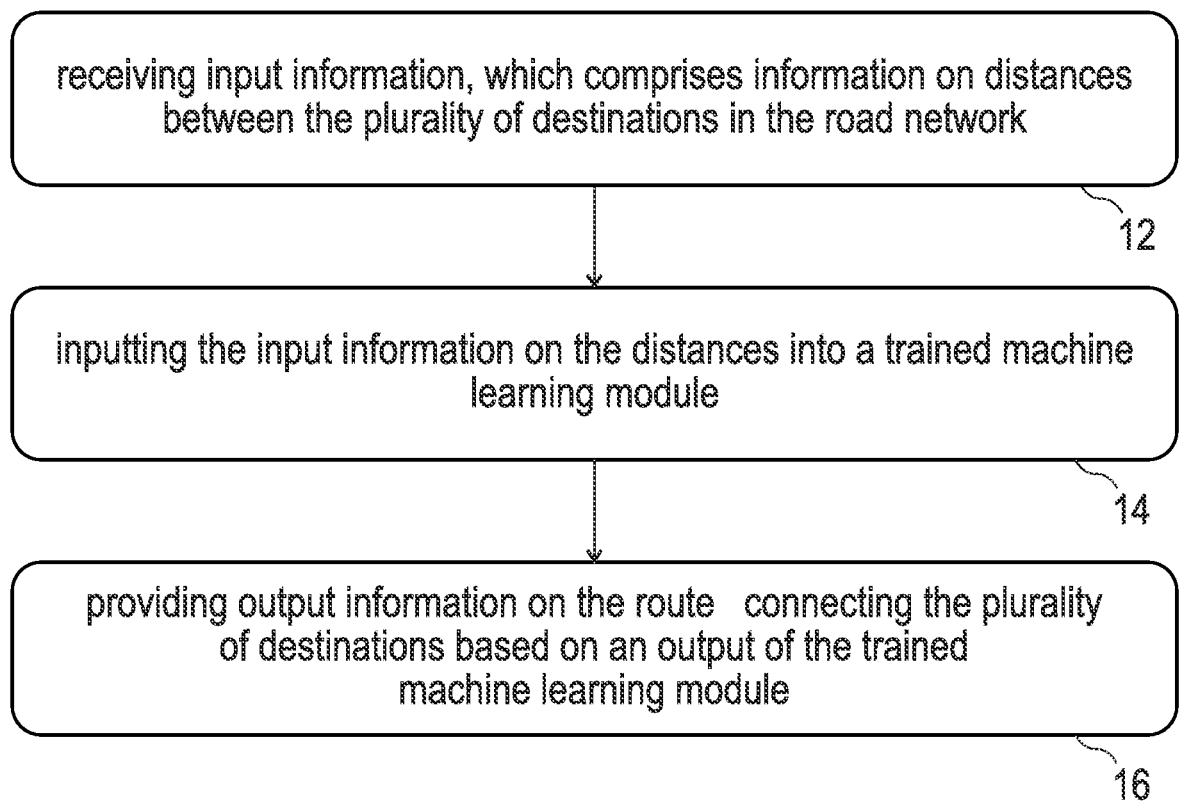
FIG. 1 shows a block diagram of a flow chart of an embodiment of a method for determining a route connecting a plurality of destinations in a road network.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Embodiments may provide a low complexity constraint optimization solution to improve the route planning, charging, delivery, fleet management, etc. Embodiments may address real life scenarios in which places are visited for a given time period, have asymmetric routing distance due to one-way limitations, and which may have a high number of visit places, etc.

Embodiments may provide a shortest or close to shortest route that visits each city and returns to the origin city for a given list of cities and the distances between each pair of cities. This is called traveling salesman (TSP) problem, which theoretically is an NP-hard problem that has no fast or scalable optimal solution. In practice, there are use cases, which require a scalable optimization service to improve user experience. Deep and/or reinforcement learning has been applied in TSP or alike that has potential to provide fast but sub-optimal solution. Embodiments may apply those algorithms to real-life distances from a road network rather than Euclidean distances between nodes given by coordinates.

For a given pair of locations represented by coordinate, the distance between them varies depending on the road network. Thus, embodiments may use a scalable algorithm based on the route distance, rather than coordinates, to address real life use cases. Embodiments may use a low complexity algorithm solution that may improve complexity with acceptable sub-optimal performance using reinforcement learning to address real life scenario.

As a motivation, it may be demanded to have enabling technology toward the optimization as a service (OaaS). To achieve this goal, it needs to support real life scenarios, e.g. routing distance rather Euclidean distance between two locations, visit the places for a given time period rather no arrival time limitation, dealing with asymmetric routing distance due to one way limitation rather always same distance between two places for either direction, and high number of visit places to avoid use case limitation. All in all, it should run very fast being able to acceptable API (application programming interface) response time upon the request.

FIG. 1 shows a block diagram of a flow chart of an embodiment of a method 10 for determining a route connecting a plurality of destinations in a road network. The method 10 comprises receiving 12 input information, which comprises information on distances between the plurality of destinations in the road network. The input information may be received from user's calendar, by user input, or through any other device. The method 10 further comprises inputting 14 the input information on the distances into a trained machine learning module. The method 10 further comprises providing 16 output information on the route connecting the plurality of destinations based on an output of the trained machine learning module. Another embodiment is a machine-readable medium including code, when executed, to cause a machine to perform a method for determining a route connecting a plurality of destinations in a road network.

Figure 2:
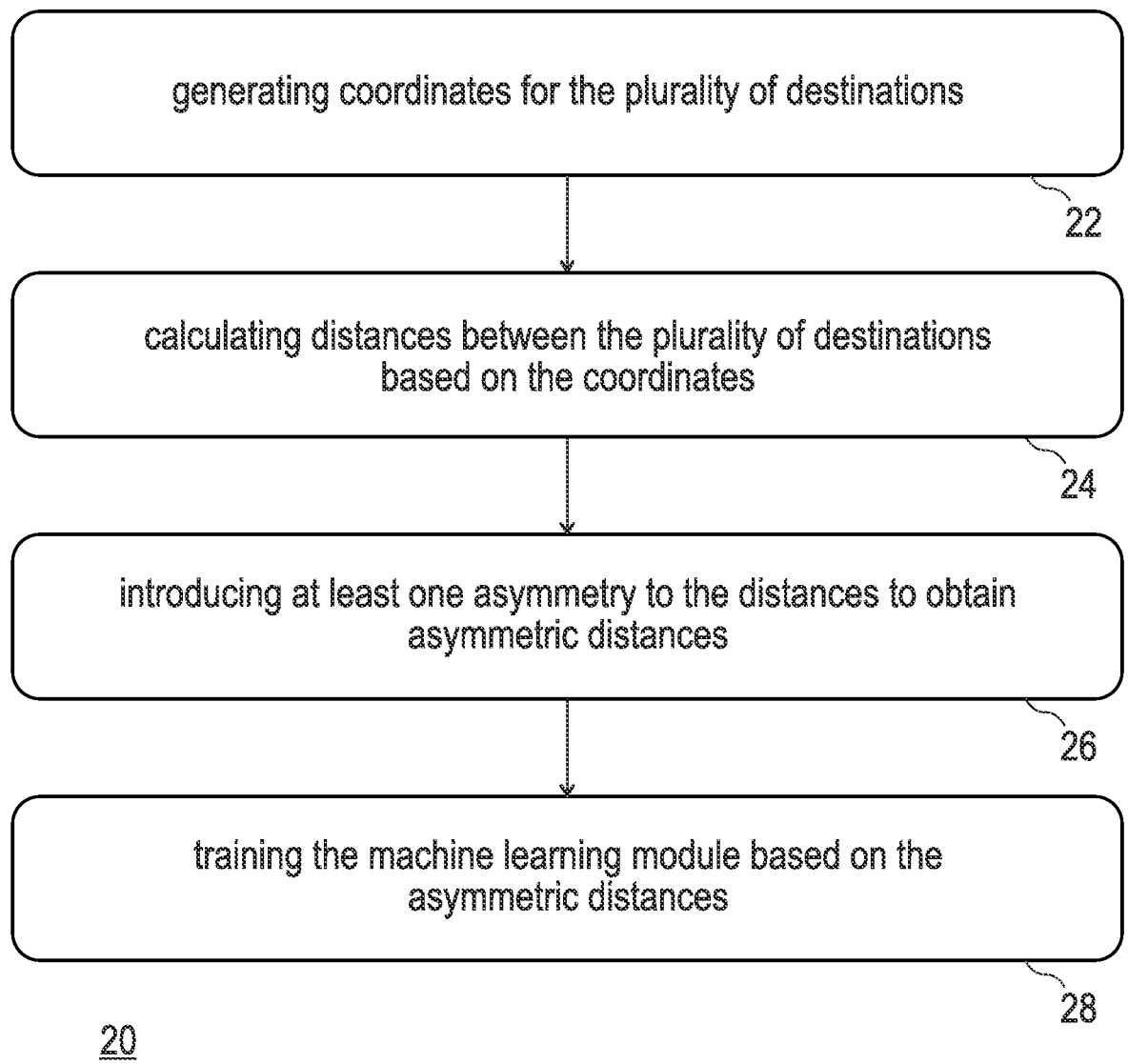
FIG. 2 shows a block diagram of a flow chart of an embodiment of a method for training a machine learning module for determining a route connecting a plurality of destinations in a road network.

FIG. 2 shows a block diagram of a flow chart of an embodiment of a method 20 for training a machine learning module for determining a route connecting a plurality of destinations in a road network. The method 20 comprises generating 22 coordinates for the plurality of destinations. The generating 22 may comprise receiving real-life data, creating artificial data simulation real-life data, receiving user input data, or data generated through ay other device. The method 20 further comprises calculating 24 distances between the plurality of destinations based on the coordinates. The method 20 further comprises introducing 26 at least one asymmetry to the distances to obtain asymmetric distances and training 28 the machine learning module based on the asymmetric distances.

For example, data is generated for model training, validation and test. Such data may use real life data, which may be generated from any data source. Examples are data generated from route information of a map service and/or from navigation platforms.

Figure 3:
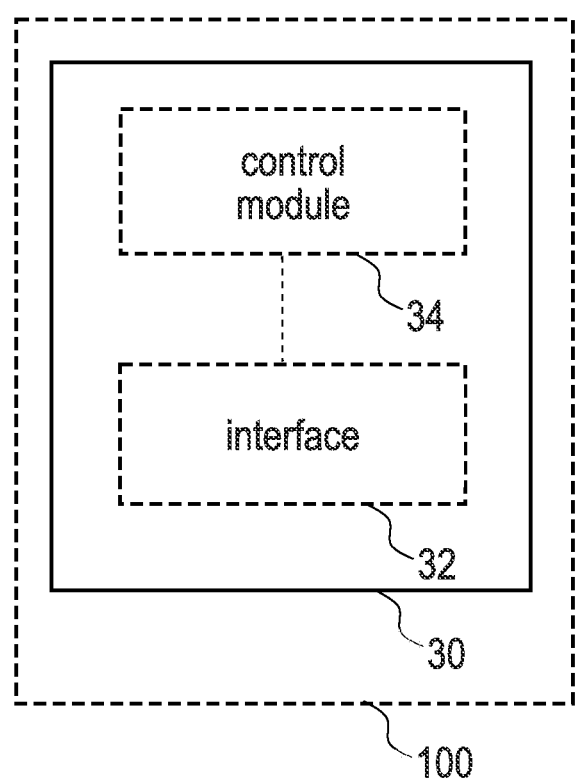
FIG. 3 shows a block diagram of an embodiment of a device and an embodiment of a vehicle.

FIG. 3 shows a block diagram of an embodiment of a device 30 and an embodiment of a vehicle 300. The device 30 comprises processing circuitry, which is configured to perform the method 10 or the method 20. Another embodiment is a vehicle 300 comprising the device 30. For example, the device 30 may comprise one or more interfaces 32, which are coupled to a control module 34. The control module 34 controls the one or more interfaces 32 and is configured to perform any of the methods 10, 20 described herein. Another embodiment is a machine-readable medium including code, when executed, to cause a machine to perform the method 20 for training a machine learning module for determining a route connecting a plurality of destinations in a road network.

In embodiments the one or more interfaces 32 may correspond to any means for obtaining, receiving, transmitting or providing analog or digital signals or information, e.g. any connector, contact, pin, register, input port, output port, conductor, lane, etc. which allows providing or obtaining a signal or information. An interface 32 may be configured to communicate, i.e. transmit or receive signals, information with further internal or external components. The one or more interfaces 32 may comprise further components to enable according communication in a (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. In some examples the one or more interfaces 32 may serve the purpose of transmitting or receiving or both, transmitting and receiving, information, such as information, input data, control information, further information messages, etc.

As shown in FIG. 3 the respective one or more interfaces 32 are coupled to the respective control module 34 at the apparatus 30. In embodiments the control module 34 may be implemented using one or more processing units, one or more processing devices, any means for processing, such as a processor, a computer or a programmable hardware component being operable with accordingly adapted software. In other words, the described functions of the control module 34 may as well be implemented in software, which is then executed on one or more programmable hardware components. Such hardware components may comprise a general-purpose processor, a Digital Signal Processor (DSP), a micro-controller, etc.

Embodiments may use a constraint optimization algorithm, which may enable the following services, though no limited to:

Optimize/improve user experience by multi-destinations-trip planning,

Minimize/reduce the travel time, distance, cost, including time-critical tasks, e.g. appointment, Optimize/improve energy consumption by charging recommendation based on trip plan and context, Enable business: optimize fleet management for ride sharing, Incubate business model, e.g. e-commerce and O2O by OaaS recommendation, smart charging to promote clean energy by improving the range via trip and charging planning, Optimize/improve traffic by centralized trip planning for crowd drivers, and Reduce the traffic, air pollution, thus better environment protection.

In summary, optimization/improvement may enable the extreme (x-est) user experience (UX) and business value. A consumer may be looking for the safest, fastest and cheapest driving experience. Embodiments may provide UX with greatest/improved product and service.

For travel salesman problem (TSP), a native solution has time complexity of $O(n!)$, e.g.

$5! = 120$, $10! = 3,628,800$, $20! = 2.43 \times 10^{18}$.

Dynamic programming algorithms can solve the problem with time complexity: O(n2×2n), but it has an exponential worst-case running time. But most of optimization objectives have a constraint,
    complexity has dramatically increased, particularly with time-window constraints, and
    there is a high demand to address dynamic change of context, e.g. appointment or schedule, traffic, weather.

Embodiments may enable technology toward an optimization as a service (OaaS). Embodiments consider real life scenarios, e.g. routing distance rather Euclidean distance between two locations, visit the places for a given time period rather no arrival time limitation, dealing with asymmetric routing distances due to one way limitations rather than always assuming same distance between two places for either direction, and a high number of visit places to avoid use case limitation.

Figure 4:
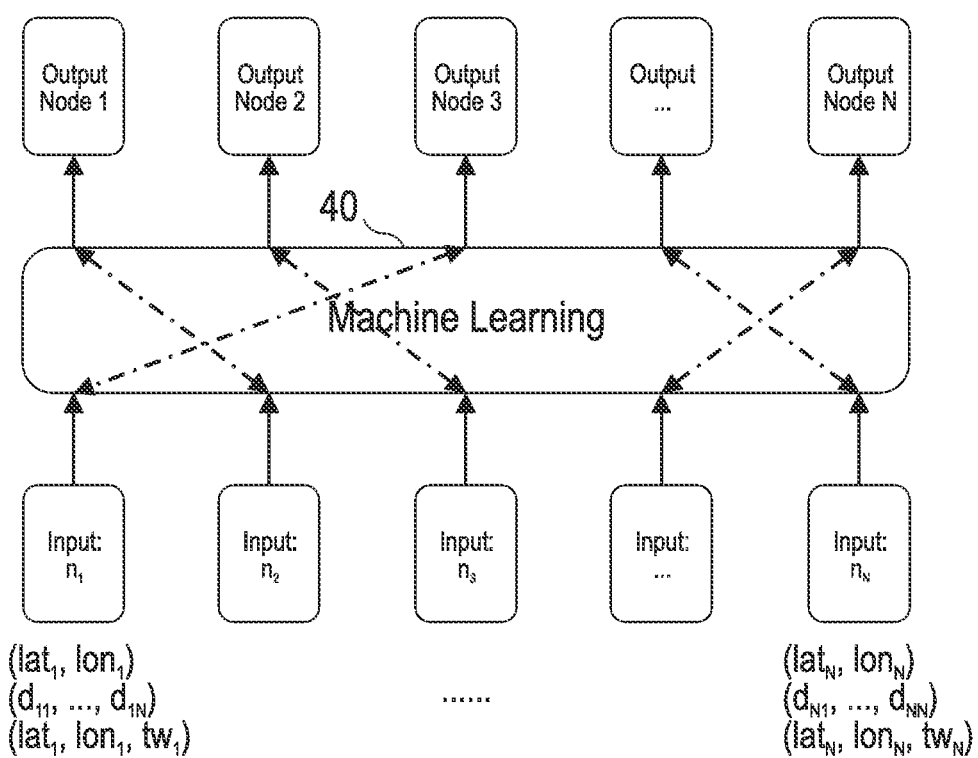
FIG. 4 illustrates a scalable optimization algorithm by distance in an embodiment.

FIG. 4 illustrates a scalable optimization algorithm by distance in an embodiment. FIG. 4 shows an implementation of an embodiment with a machine learning module 40 in the center. The machine learning module 40 receives input data from the bottom and provides output data to the top.

Assume there are N nodes: $n_i$, where $1 \leq i \leq N$ $$\text{Coordinate: } n_i = (lat_i, lon_i)$$

$$\text{Distance: } D = \begin{pmatrix} d_{11} & \cdots & d_{1N} \\ \vdots & \ddots & \vdots \\ d_{N1} & \cdots & d_{NN} \end{pmatrix}$$

where $n_{ij}=\text{dist}(n_i, n_j)$, from route service. The information on the distances between the destinations may hence comprise a matrix with mutual distances between pairs of the plurality of destinations. The mutual distances between the pairs are at least partly asymmetric.

For one-way route: $d_{ij} \neq d_{ji}$,
for case of M nodes, where M≤N, we have introduced the padding, e.g.

$$d_{i(M)}=d_{i(M+1)}= \ldots =d_{i(N)}.$$

It can also pad for the first node, too. For the padded nodes, they may or may not be exactly the same, but should be very close each other.

For each of location, a representation can be by $$\text{Coordinate: } n_1 = (lat_1, lon_1) \text{ or}$$

$$\text{Distance: } D = \begin{pmatrix} d_{11} & \cdots & d_{1N} \\ \vdots & \ddots & \vdots \\ d_{N1} & \cdots & d_{NN} \end{pmatrix},$$

or simplified by a vector $(d_{11}, \ldots, d_{1N})$.

As indicated by FIG. 4, the input parameters may be conventional coordinates $(d_{11}, \ldots, d_{1N})$, distance based as in an embodiment $(d_{11}, \ldots, d_{1N})$, and there may be time-window constraints $(lat_1, lon_1, tw_1)$ (certain destinations have to be visited in a time window, e.g. "the kids need to be taken to school between 7.30 and 8 am"). In some embodiments, the input information further comprises information on a time window constraint for at least one of the plurality of destinations. The method may further comprise inputting the information on the time window constraint into the trained machine learning module 40.

Some embodiments may use an encoder/decoder architecture in the machine learning module 40. For example, context embedding may comprise embedding output from an encoder and embedding of first and last node of the route. A decoder may run N steps to decode an output sequence (N equal to input node number). A decoder may have one layer, a encoder may have multiple layers (e.g. 3 in some embodiments).

Embodiments may incorporate distance and time window constraints into embedding and use normalized start and end time of time windows, which are combined with a distance matrix as inputs. Time window constraints can be encoded into the embedding. Embodiments may determine embedding information for the machine learning module. The embedding information may comprise a vector with a predetermined size. For example, a padding technique may be used to aligned input dimensions. For example, the method 10 may comprise adapting the input information to a predetermined number of destinations. The adapting may comprise complementing the plurality of destinations to the predetermined number of destinations by introducing virtual destinations. For example, the input can be 10 destinations, but input number can be 20, thus embedding vector can be 20 w/o constraint, or 20+2=22 including time-windows constraints, etc. The adapting may further comprise complementing destinations without a time window constraint with a non-restrictive time window constraint.

The virtual destinations may be determined in a way that they do not influence the route via the real destinations, e.g. the virtual destination are all located very close to the origin of the route. The time windows constraints of the virtual destination may be selected in way, that they are non-restrictive, e.g. a short window after start will put the virtual destinations in sequence of their low distances at the beginning of the route. In other embodiments they may be put at the end of route.

Embodiments may also use a reward function for reinforcement learning, when training the machine learning module 40. Such a reward function may combine a total travel time and a score (quality information for a solution), which measure a compatibility of travel time vs time-window constraint. The training 28 of the machine learning module 40 may hence comprise determining rewards for candidate routes determined by the machine learning module. The determining of the rewards can be based on an overall distance of a candidate route. The determining of the rewards may be further based on a compliance of a sequence of the plurality of destinations in a candidate route with predetermined time window constraints for the plurality of destinations.

For example, a score can be calculated based on the sum of times exceeding the latest arrival time for every node in the decoded path; if a travel time fits in the time window constraint for every node in the route, the score is zero. With this reward function, during model training, the target becomes finding a policy such that a decoded route has a low travel cost and meets time window constraint.

For example, an input feature is defined as: $x_i=\{d_{i,0}, d_{i,1} \ldots d_{i,N}, s_i, e_i\}$ $i=1 \ldots N$. Here N means the number of locations/destinations; $d_{i,j}$ means road distance from location i to location j; $[s_i, e_i]$ were time constraint denoting for earliest and latest arrival time for location i.

Conventional research uses coordinates as input and assumes the distance between the locations as Euclidean distance. However, in a real-world situation, the road between two locations is not a straight line, there is no mathematic formula to calculate real road distance just from coordinates. So, in embodiments road distance is treated as input feature.

There are approaches on TSPTW (TSP time window) using MIP (Mixed integer problem) and a heuristic approach. An MIP approach could get an optimized solution, but it is extremely time consuming. A heuristic method usually has a non-optimal solution and only works for certain solutions.

In an embodiment the input embedding generation can be defined as $h_i=W^x x_i+b^x$. Here $W^x$ and $b^x$ are learned parameters of linear project that map the input feature to the embedding space. The dimension of the embedding space is 128 in current implementation.

As outlined above embodiments may provide a method to deal with flexible node sizes and constraints. For example, the dimension of input features is N+2, which means the trained model can only work with problems with N locations/destinations and a time window is required for each location. However, for a real-world problem, the location size is not fixed, time windows might not be required for each location. In some embodiments the following methods may solve the issues.

For location j without time window constrain, a virtual time window is created as $[0, T_N^{max}]$ $T_N^{max}$ is a predefined large number which exceeds reach time of any possible route for problem size N. The time window is therefore non-restrictive.

For a problem with location number M<N, K=N−M virtual locations are created, the virtual node is almost same as departure location, distance between virtual nodes is $\sigma * dist_{random}$, the distance between virtual locations and other location were generated as:

$$\begin{cases} dist_{departure,j} = \sigma * dist_{random} \\ dist_{i,j} = \sigma * dist_{random} + D_{max} \\ dist_{j,i} = \sigma * dist_{random} + dist_{departure,i} \end{cases}$$

Here j means virtual locations, i means normal locations except departure location, σ is a small weight coefficient ($10^{-8}$ in current setup), $D_{max}$ is a very large value to prevent visiting virtual locations after normal locations, $dist_{random}$ mean random generated distance variable. For each virtual node, a virtual time window was also created as $[0, T_{min}]$, $T_{min}$ is a small number to ensure visiting virtual locations before normal locations.

Decoding may run sequentially N times, N is the number of input nodes. At step t, the decoder outputs $\pi_t$ based on the compatibilities of current context embedding and embedding from encoder.

At step t, context embedding could be described as: $h_t^c=[\bar{h}^N, h_{\pi_{t-1}}, h_{\pi_1}]$, $\bar{h}^N$ is the embedding from the encoder which shows the information of the whole inputs, $h_{\pi_k}$ is the node embedding from encoder for node $\pi_k$, and $h_t^c$ shows the information of decoded output and information of whole inputs. At initial step, $h_1^c=[\bar{h}^N, h_{depot}, \bar{h}^N]$, $\bar{h}^N$ is a trainable embedding.

At step t, for every node i not in $\{\pi_1 \ldots \pi_{t-1}\}$, set $q_{c,t}=W^Q h_t^c$, $k_i=W^k h_i$, the compatibilities of context embedding and node i could be calculated as:

$$u_{i,t} = C \cdot \tanh\left(\frac{q_{c,t}^T k_i}{\sqrt{d_k}}\right)$$

$d_k$ is the query/key dimensionality of multi-head attention. $W^Q$ and $W^k$ are learnable parameters, C=10 in current embodiment.

The output probabilities of for node i could be calculated using a SoftMax:

$$p_{i,t} = \frac{e^{u_{i,t}}}{\Sigma_j e^{u_{j,t}}}$$

j means nodes not in $\{\pi_1 \ldots \pi_{t-1}\}$. During an evaluation stage, some embodiments just pick up the node with highest probability as output $\pi_t$.

Deep reinforcement learning may be used in some embodiments. Transformer encoder/decoder may have millions of learned parameters, millions of training samples with corrected label (sequence) can be required to optimize the model using supervised training. However, it will take years to get millions of training samples with corrected label; for example, it takes about 1 day to solve 2048, 15-nodes TSPTW problems using MIP (CBC, COIN Branch and Cut solver, which is an open source Linear Programming (LP) and Mixed Integer Programming (MIP) solver).

Deep reinforcement learning (RL) can be applied to self-learn the model. For RL, a proper reward function was the key in some embodiments.

Figure 5:
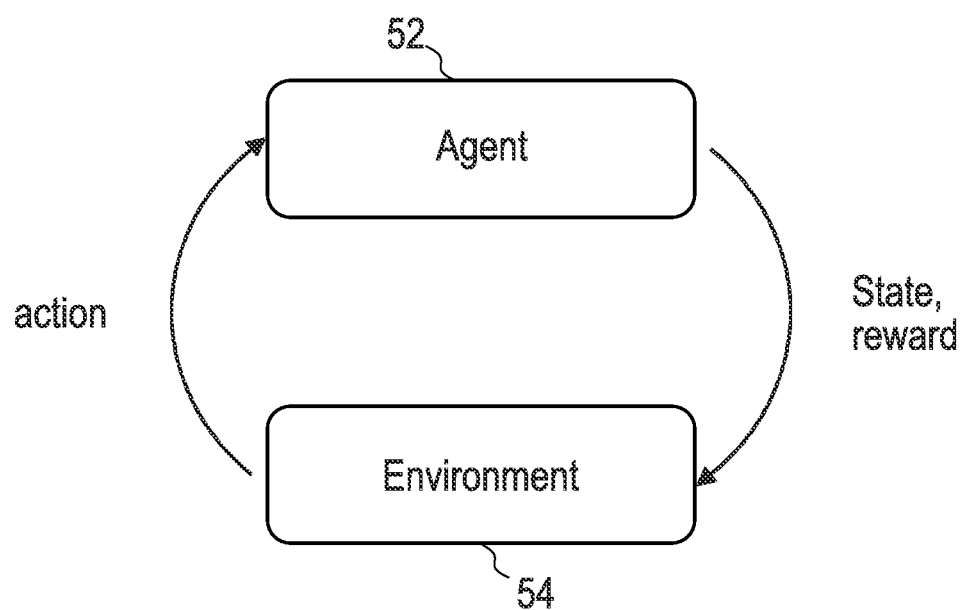
FIG. 5 illustrates a reward procedure in an embodiment.

FIG. 5 illustrates a reward procedure in an embodiment. FIG. 5 shows an agent 52 and an environment 54 interacting with each other. The agent 52 here could be transformer encoder/decoder, which takes nodes and time window as input state. The action is the nodes visiting sequence, which the agent chooses for a given input state. The environment 54 evaluates the nodes visiting sequence and gives the reward, which shows how good the action was. The agent 52 receives the reward and adjusts the parameters according to the reward signal.

A reward function in an embodiment can be defined as $$R(\pi|s)=L(\pi|s)$$

Here s is the state, the input question to be solved; π is the solution agent given. $L(\pi|s)$ is the cost function given s, π, it shows how good the π is given s. For TSP problem, cost function equals to route length of solution π. For TSPTW, the target was shortest travel distance or time and visiting each location during time-window. Here cost function could be defined as total travel time plus delay penalty, it can be calculated as:

Suppose the location sequence in π is $\pi_1, \pi_2, \ldots \pi_N$,

---

Penalty = 0
For i=1 to N
    $t(\pi_i) = t(\pi_{i-1}) + travel\_time(\pi_{i-1}, \pi_i)$
    If $t(\pi_i) < s_{\pi_i}$: $t(\pi_i) = s_{\pi_i}$
        If arriving location before earliest open time, user must wait until location open.
    If $t(\pi_i) > e_{\pi_i}$: Penalty+= $(e_{\pi_i} - t(\pi_i))$
$L(\pi|s) = W * Penalty + t(\pi_N)$
W=100 in current embodiment

---

Model parameters update rule can be:

$$\nabla \mathcal{L}(\theta|s)=E_{p_\theta(\pi|s)}[(L(\pi|s)-b(s))\nabla \log p_\theta(\pi|s)]$$

$\mathcal{L}$ means the expectation of reward
b(s) is the reward of baseline model, it could be defined as $L(\pi_b|s)$; $\pi_b$ is the action baseline model b given for s. $L(\pi|s)-L(\pi_b|s)$ measurement of the gain of action it compared to action $\pi_b$. The baseline model is chosen as the best model till now.

The training is a self-learn process, the model is iteratively improved against current best model.

θ is the model parameter.

Training step:

Initialize model and baseline model with random parameters.

For each epoch:
  For each batch:
    Choose action π for all training samples, calculate reward, and update model parameters.
    Generate a new validation set, comparing cost value for the validation set using updated model and current baseline model, choose the model which have better cost as new baseline model.

Existing TSPTW datasets only have thousands of samples, it is not enough to proper train and test the model.

In the following distance metric generation in an embodiment will be detailed:

For Euclidean distance input, first the method generates node coordinates as uniform distribution on the interval [0,1) and then calculates the Euclidean distance between each node pair.

For symmetric road distance, there are two setups to generate data:

Distance Metric 1:

First two random coordinates are generated for each node i as $c_i=(c_{i,0},c_{i,1})$ and $f_i=(f_{i,0},f_{i,1})$, then road distance between node i and j could be calculated as:

$$d_1(i,j)=\|c_i-c_j\|+\alpha*\|f_i-f_j\|$$

$\|c_i-c_j\|$ means Euclidean distance between $c_i$ and $c_j$, α is a random value on the interval [0.1,2), it is fixed for one problem instance. It is obvious that $d_1(i,j)$ meets the conditions of distance metric, it satisfies the triangle inequality: $d_1(i,j) \leq d_1(i,k)+d_1(k,j)$; $d_1(i,j)$ is not a Euclidean distance; since a is different for different problem instances, $d_1(i,j)$ is also a random metric function. In this embodiment the generating 22 comprises generating at least two random coordinates per destination and combining at least two distances based on the at least two coordinates per destination for calculating the distances.

Distance Metric 2:

First random coordinates are generated for each node i as $c_i=(c_{i,0},c_{i,1})$, then road distances between i and j could be calculated as:

$$d_2(i,j)=d_2(j,i)=\|c_i-c_j\|*\alpha_{i,j}$$

$\alpha_{i,j}$ is a random value on the interval [1,3) for node pair (i,j), $d_2(i,j)$ couldn't always satisfy the triangle inequality. $d_2(i,j)$ is more randomly and generalized than $d_1(i,j)$.

In real world situation, travel time/distance between location may be asymmetric, for example, there are many one-way roads. For asymmetric road distances, then are two setups to generate the distance metric.

Distance metric 3 (50% asymmetric):

First road distance data is generated following distance metric 1. For each pair of nodes (i,j), draw a random value γ on [0,1), if γ<0.5, distance between (i,j) keep symmetric; if γ≥0.5, draw another random value ϑ on [0,1), if ϑ≥0.5, $d_3(i,j)=d_1(i,j)*\alpha_{i,j}$ $d_3(j,i)=d_1(i,j)$, otherwise, $d_3(i,j)=d_1(i,j)$, $d_3(j,i)=d_1(i,j)*\alpha_{i,j}$. $\alpha_{i,j}$ is a random value with Gaussian distribution (mean=1.0, std=0.5).

Distance metric 4 (full asymmetric):

First random coordinates for each node i are generated as $c_i=(c_{i,0},c_{i,1})$, then for each pair (i,j).

$$d_4(i,j)=\|c_i-c_j\|*\alpha_{i,j}$$

$\alpha_{i,j}$ is a random value on interval [1,3.0) for pair (i,j), $\alpha_{i,j}$ and $\alpha_{j,i}$ were independent random variable, typical $\alpha_{i,j} \neq \alpha_{j,i}$. On average 50% distance in method 3 are asymmetric, while all distance in method 4 are asymmetric.

For the TSPTW problem, purely randomly generated time windows might not have a valid solution at all. For example, if a time window of node α is [5.0,6.1], node b is [4.5,5.6], travel time between a and b is 2.0, there is no feasible solution to visit both a and b. The following approach may be used in embodiments to ensure that generated data always have a feasible solution. In this embodiment the method 20 further comprises generating time window constraint information for the plurality of destinations.

First generating nodes' input distances, then generate a random permutation of nodes as $\pi_1 \ldots \pi_N$, assume the permutation was the visiting sequence; calculating the arrival time $a_{\pi_i}$ of each node following the permutation, the generating of the time window constraint information can be based on the asymmetric distances, For each node i, draw a random value $w_i$ on interval [0.4,5), $w_i$ was the time window width, draw another random value $p_i$, on interval [0,1), the start time $s_i$, end time $e_i$ of time window was calculated as:

$$s_i=a_i+w_i*(p_i-1)$$

$$e_i=a_i+w_i*p_i$$

It is obvious that the generated permutation $\pi_1 \ldots \pi_N$ was a valid solution given the generated distance and time window constraint. However, $\pi_1 \ldots \pi_N$ might not be the best solution.

In embodiments the generating of the time window constraint information may assume a random sequence of the asymmetric distances and may assign at least partly rational time window constraints to destinations fitting the given random sequence.

In the following experiments simulations of embodiments will be detailed. The first setup is for a unified TSP without time constraints.

The setup of an experiment can be summarized as follows:

All models were trained for 20 nodes TSP, 2 Million (M) generated data sets in each training epoch, Test size: 2048 test samples.

Evaluation method:
  CBC with Miller-Tucker-Zemlin formulation to find the shortest travel distance for each test instance.
  Metric:
    Suppose for test instance $t_i$, the shortest travel distance is $dist^*(t_i)$ (calculated from CBC); the travel distance of path decoded from transformer is $dist^t(t_i)$, the gap is:

$$gap = \frac{dist^t(t_i) - dist^*(t_i)}{dist^*(t_i)}.$$

For Euclidean distance:
  Using coordinates as input (state-of-art), average gap=0.18%, and
  Using distance as input in embodiment, average gap=1.1%.

Running time was about 2 seconds using 1 core CPU for 2048 test samples, $10^4$ time faster than CBC.

For symmetric road distance:
Model 1 was trained with random generated data following distance metric 1 (hold triangular inequality),
Model 2 was trained with random generated data following distance metric 2 (didn't hold triangular inequality, more generalized),
Test dataset 1 was 2048 test data following distance metric 1,
Test dataset 2 was 2048 test data following distance metric 2, and
Below are the average gaps for each model and test dataset:

| | | |
|---|---|---|
| Model 1, | Test1: 4.0%, | Test 2: 15.13% |
| Model 2, | Test1: 4.54%, | Test 2: 5.43% |

Summary: The model trained with generalized data (model 2) has better generalization power, it has a better overall performance.

Unified model for different distance metric:
Model was trained with 4M random generated data sets in each epoch, it includes the following 3 types of data:
Data following asymmetric road distance metric 4,
Data following symmetric road distance metric 1, and
Data following Euclidean distance.
Test data including data from all 5 type of distance metric:
  Test 1 was 2048 test samples following Euclidean distance,
  Test 2 was 2048 test samples following symmetric road distance measure 1 which hold triangle inequality,
  Test 3 was 2048 test samples following symmetric road distance measure 2 (Purely random),
  Test 4 was 2048 test samples following distance metric 3 (50% asymmetric), and
  Test 5 was 2048 test samples following distance metric 4 (100% asymmetric).
The following table shows the detailed performance information.

| Dataset | Overall | Test 1 (Euclidean distance) | Test 2 (road distance) | Test 3 (random road Distance) | Test 4 (50% Asymmetric) | Test 5 (100% Asymmetric) |
|---|---|---|---|---|---|---|
| Gap | 4.53% | 2.54% | 4.35% | 3.04% | 4.97% | 7.77% |

Summary: Training with different types of data will get a more generalized model. Generally, the gap will increase as distance metric becomes more complicated. Test 4 and Test 5 were extreme cases; results from test 2 and test 3 were more suitable to evaluate performance in real world situation.

In the following experiments for TSP with time window constraints (TW) will be described. The setup can be summarized as follows:
Most models were trained for 15 nodes TSPTW, 8M to 64M training data, 2M or 4M sampled data in each training epoch,
Target was to visit all locations with shortest travel cost (return to start location is not included in the target), 2048 test data for each test setup, and
CBC to find best solution for each test data. For some tasks, IBM ILOG CPLEX was used to find best solution. Since some test samples may need more than 10 minutes or even hours to solve, time limit was set for CBC and CPLEX: 240 seconds for CBC (total time), 60 seconds for CPLEX (if k cores were used, total time was 60*k seconds), the result from CBC/CPLEX might not be a globally optimized result, for some instances the result from CBC and CPLEX were different.

Performance metric:
Coverage: number of solutions from transformer encoder/decoder which meet the time window constraints divided by the number of test samples. Coverage shows the percentage of valid solutions, and
Gap: suppose shortest time cost was $t_i^*$ for test sample 1, if the solution from transformer is valid and time cost was $t_i$, gap is $$gap = \frac{t_i - t_i^*}{t_i^*}$$

For symmetric road distances and time-window constraints:
Training for 15 nodes TSPTW, distance between nodes following distance metric 1; 8M training data, 2M sampled data in each training epoch
2048 test samples, best solution got from CBC.
Test results:
Coverage: valid results percentage 86.7%
Accuracy: gap=2.86%

In the next experiment TSP with time constraints and variable nodes is considered. Objective: Aim to train one model but use for different tasks, with different number of nodes and constraints.
Train: 64M training samples, 4M sampled data in each training epoch; the following 4 type of data were included in the training data:
Case 1: 15 nodes TSPTW, every node has a time window constraint,
Case 2: 15 nodes TSPTW, average 50% of the nodes have time window constraints,
Case 3: 15 nodes TSP, no time window constraint,
Case 4: 10 nodes TSPTW, every node has time window constraint, and
All models follow symmetric distance metric 1.
Test: 2048 test samples for each case, there are 8192 test samples in total, the table below shows the evaluation result of the model:

| | 10 Nodes TSPTW | 15 Nodes TSP | 15 Nodes 50% TSPTW | 15 Nodes TSPTW |
|---|---|---|---|---|
| Coverage | 96.25% | 100% | 99.02% | 91.21% |
| Gap (CBC) | 3.0% | 6.26% | 3.87% | 1.92% |
| Gap (CPLEX) | 3.0% | 6.26% | 4.52% | 1.93% |

Summary: for 15 nodes TSPTW, the unified model even has better performance than single model 91.21% vs 86.7%, it shows the efficiency of training one model for different tasks.

In the following the objective is changed:

Objective: Test the performance of different target settings, the target here is total travel time including time returning to start location, the loss function is different.

Train: 64M training samples, 4M sampled data in each training epoch; the following 4 type of data were included in the training data:

Case 1: 15 nodes TSPTW, every node has time window constraint,

Case 2: 15 nodes TSPTW, average 50% nodes have time window constraints,

Case 3: 15 nodes TSP, no time window constraints,

Case 4: 10 nodes TSPTW, every node has a time window constraint, and

All models follow symmetric distance metric 1.

Test: 2048 test samples for each case, there are 8192 test samples in total, the table below shows the evaluation result of the model:

|  | 10 Nodes TSPTW | 15 Nodes TSP | 15 Nodes 50% TSPTW | 15 Nodes TSPTW |
|---|---|---|---|---|
| Coverage | 96.82% | 100% | 99.02% | 91.21% |
| Gap (CBC) | 2.79% | 5.76% | 3.82% | 2.04% |
| Gap (CPLEX) | 2.80% | 5.76% | 4.25% | 2.05% |

Summary: For 15 nodes TSPTW different targets have similar performance.

The next experiment is conducted for TSP with time windows constraints and asymmetric distances:

Training for 15 nodes TSPTW, distance between nodes follows distance metric 3; 16M training data, 4M sampled data in each training epoch.

Two test cases: 2048 test samples following asymmetric road distance, 2048 test samples following symmetric road distance (same test data as symmetric TSPTW setup). The below table shows results of two test using asymmetric TSPTW model:

|  | Asymmetric TSPTW | Symmetric TSPTW |
|---|---|---|
| Coverage | 87.8% | 91.21% |
| Gap | 2.42% | 1.92% |

Summary: With enough training data and training epochs, asymmetric TSPTW could reach similar performance as symmetric TSPTW.

The following experiment considers TSP and TW for 20 nodes with road distances.

Training for 20 nodes TSPTW, distance between nodes follows distance metric 1, 100% and 50% nodes have time window constraints; 24M-40M training data, 4M sampled data in each training epoch, Test case: two sets of test cases, each have 2048 test samples, distance between nodes following distance metric 1, the first case 100% node have time window constraints, the second 50% nodes have time window constraints:

|  | 100% TW | | 50% TW | |
|---|---|---|---|---|
|  | Coverage | Gap | Coverage | Gap |
| 15 Nodes TSPTW | 91.21% | 1.92% | 99.02% | 3.87% |
| 20 Nodes TSPTW | 89.01% | 1.74% | 98.88% | 5.86% |

Summary: With sufficient training (15 nodes TSPTW have more training data and more training iterations), 20 nodes TSPTW could reach similar performance as 15 nodes TSPTW. The proposed model in embodiments could deal with problems with large number of nodes.

In the following the complexity of an embodiment will be considered in view of open source CBC.

The experiments summarize the system complexity of transformer model with open source CBC, The time consumption for the following scenarios were tested:

Solve 2048 20-nodes TSP,

Solve 2048 15-nodes TSP+TW,

Solve 2048 20-nodes TSP+TW,

Test was running on a virtual machine with 2.6 Ghz 12-cores CPU,

Running time of mixed integer programing (CBC) and proposed transformer encoder/decoder were tested. CBC was running on 4 cores; transformer was limited to use 1 core. CBC time limit for each instance was 240 seconds, Memory consumption:

CBC: 500M, transformer decoding: 300M, transformer training: ~15 GB (20-nodes TSPTW, 4M data per epoch), and GPU (Graphics Processing Unit): Transformer runs at least 8× faster than CPU (Central Processing Unit), resulted in less is for 2048 cases; CBC can only run in CPU.

Summary: While mixed integer programing (CBC) could get optimized solutions for TSP and TSPTW, the time consumption was too high. Adding time window constraints will increase time consumption of CBC about 17 times, while the transformer model does not add much over-head for complexity. The speed of transformer model could meet the requirement of response time in API service.

In the following the complexity of an embodiment will be considered in view of licensed CPLEX.

The experiments summarize the system complexity of transformer model with IBM CPLEX, The time consumption for the following scenario were tested:

Solve 2048 15-nodes TSP+TW,

Solve 2048 20-nodes TSP+TW,

Solve 8192 15 nodes mixed TSPTW (2048 TSPTW, 2048 partly TSPTW, 2048 TSP, 2048 10 nodes TSPTW), Test was running on a virtual machine with 2.6 Ghz 12-cores CPU, CPLEX was running on 6 cores, transformer was limited to use 1 core. CPLEX time limit for each instance was 60 seconds, Memory consumption:
CPLEX: 600-900M;
transformer decoding: 300M,
transformer training: ~15 GB (20-nodes TSPTW, 4M data per epoch), and
GPU: Transformer runs at least 8× faster than CPU, resulted in less 1s for 2048 cases; CPLEX can only run in CPU.
Summary: While state-of-art licensed software (CPLEX) is much faster than open source CBC, but still far below requirement of real-time service. The speed of transformer model is much faster than state-of-art commercial MILP software.

Embodiments may provide a scalable algorithm solution for NP-Hard problem toward the optimization as a service (OaaS): It is fundamental for scalable service to respond in a meaningful time with a low computational complexity algorithm for NP-Hard optimization problem in nature. It broadens the use cases, thus bring more values for consumers and businesses.

Embodiments may provide an applicable solution to bring true value for user experience and business value: Algorithm applies on the distance-based space to meet the real life setup, e.g. route distance, rather ideal straight line distance, tidal lane rather symmetric route, where the distance is kept the same either from A to B or B to A.

Embodiments may provide an improved user experience, enabled by optimization as a service from route planning, saving cost and time, reduce traffic and air pollution, extend the range to smart recommendation, e.g. charging, etc.

No label data may be required in some embodiments. They might not need the ground truth as manually collected training label because of the reinforcement learning framework and hence, the training may be low cost and attractive.

Embodiments may provide an improved business value. Embodiments may dramatically optimize the cost for car-sharing service, delivery and pickup services. They may also enable new business models, e.g. recommendation or targeted ad when helping a user to optimize the objective, such as route planning. It may bring an opportunity to jointly optimize user experience (saving the cost, time, and effort) and $3^{rd}$ party services (profit from charging, refueling, parking, restaurant) with constantly learnt user preference.

At least some embodiments might have no limitation for the reference machine learning framework: The above embodiments are based on one reference implementation to which they are not limited to. In general, distance-based approach can also be applied to other machine learning frameworks, e.g. transformer-based algorithm for possible performance improvement and other added-values.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for determining a route connecting a plurality of destinations in a road network, the method comprising:
receiving input information, which comprises information on routing distances between two destinations of each pair of destinations among the plurality of destinations in the road network, wherein a routing distance between two destinations of each pair is a road distance measured from one destination of the pair to the other destination of the pair on the road network;
inputting the input information into a trained machine learning module;
determining, by the trained machine learning module, a route connecting the plurality of destinations in the road network based on an overall routing distance of candidate routes connecting the plurality of destinations; and
generating output information on the determined route, wherein the information on the routing distances comprises a matrix with mutual routing distances between two destinations of each pair of the plurality of destinations, and a mutual routing distance between two destinations of at least one pair is asymmetric.

2. The method of claim 1, wherein the input information further comprises information on a time window constraint for at least one of the plurality of destinations, and further comprising inputting the information on the time window constraint into the trained machine learning module, wherein the route is determined further based on a compliance of the time window constraint for a destination in the candidate routes.

3. The method of claim 1, wherein the mutual routing distances between two destinations of at least one pair of destinations is asymmetric.

4. The method of claim 1, further comprising determining embedding information for the machine learning module.

5. The method of claim 3, wherein the embedding information comprises a vector with a predetermined size.

6. The method of claim 1, further comprising adapting the input information to a predetermined number of destinations.

7. The method of claim 6, wherein the adapting comprises complementing the plurality of destinations to the predetermined number of destinations by introducing virtual destinations.

8. The method of claim 6, wherein the adapting comprises complementing destinations without a time window constraint with a non-restrictive time window constraint.

9. A device comprising processing circuitry configured to perform the method of claim 1.

10. A vehicle comprising the device of claim 9.

* * * * *